United States Patent
Krappel et al.

[11] Patent Number: 5,818,121
[45] Date of Patent: Oct. 6, 1998

[54] ON-BOARD WIRING SYSTEM FOR VEHICLES

[75] Inventors: Alfred Krappel, Ismaning; Robert Albiez, Reichertshofen; Maximilian Groebmair, Dietramszell; Bernhard Fahrnbauer, Munich, all of Germany

[73] Assignee: Bayerische Motoren Werke AG, Germany

[21] Appl. No.: 802,772

[22] Filed: Feb. 21, 1997

[30] Foreign Application Priority Data

Feb. 21, 1996 [DE] Germany ............... 196 06 450.3

[51] Int. Cl.⁶ ............................................... B60K 28/10
[52] U.S. Cl. .................... 307/10.7; 307/9.1; 307/10.1; 307/119; 180/271; 180/281; 180/279; 200/61.08
[58] Field of Search .............................. 307/9.1, 10.1, 307/10.2–10.8, 119; 180/271, 274, 279, 281–283; 200/61.08; 361/115; 280/727

[56] References Cited

U.S. PATENT DOCUMENTS

| | | | |
|---|---|---|---|
| 4,149,093 | 4/1979 | D'Alessio et al. ............... | 320/40 |
| 4,224,487 | 9/1980 | Simonsen ............... | 200/61.08 |
| 5,019,935 | 5/1991 | Nakamura ............... | 361/45 |
| 5,510,658 | 4/1996 | Nakayama ............... | 307/10.1 |
| 5,521,788 | 5/1996 | Miyazaki ............... | 307/82 |
| 5,535,842 | 7/1996 | Richter et al. ............... | 180/279 |
| 5,574,316 | 11/1996 | Nieschulz ............... | 307/10.1 |

*Primary Examiner*—Ronald W. Leja
*Assistant Examiner*—Peter Ganjian
*Attorney, Agent, or Firm*—Evenson, McKeown, Edwards & Lenahan, P.L.L.C.

[57] ABSTRACT

In an on-board wiring system for vehicles has a battery line for connecting a generator with an energy accumulator and a disconnection switch, actuated as a result of an accident, arranged therein. Additional consuming devices are connected to the energy accumulator by way of a consuming device line. The disconnection switch 2 is constructed such that, in addition to the battery line 3, it also interrupts the consuming device line 9 and in the process also disconnects it from the battery line 3.

8 Claims, 2 Drawing Sheets

ON-BOARD WIRING SYSTEM FOR VEHICLES

BACKGROUND AND SUMMARY OF THE INVENTION

This application claims the priority of Germany priority document No. 196 06 450.3, the disclosure of which are expressly incorporated by reference herein.

The invention relates to an on-board wiring system for a vehicle having an electric generator which is connected to an energy accumulator by means of a switch which is actuated in response to an accident.

Such an on-board wiring system is disclosed in International Patent Document WO 95/21454 A. However, in this case, only the battery line is connected to the disconnection switch, individual consuming devices being independently connected to the energy accumulator by way of a separate connection. This construction of the on-board wiring system is suitable for electric consuming devices which must be connected with the energy accumulator, even after an accident. However, as a result, all lines to the consuming devices must be protected by means of conventional fuses, which interrupt the current supply only in the case of actual electric short circuits. The individual electric drives/consuming devices are not switched off in the case of an accident.

When existing disconnection switches are relied on for disconnecting additional consuming devices from the energy source in the case of an accident or other event, such consuming devices could be connected to the battery line. However, even when the connection to the energy accumulator is interrupted by the disconnection switch, there is the danger that the generator will continue to run after an accident, and thus continue to supply electric energy to the consuming device by way of the consuming device line electrically connected with the battery line. The desired disconnection of the electric consuming devices arranged on this special consuming device line can therefore not be ensured.

The object of the present invention is to provide an on-board wiring system of the type mentioned above, in which electric consuming devices are securely separated from the electric energy supply in case of an accident.

This and other objects and advantages are achieved by the on board wiring system according to the invention, in which an electric connection normally exists between the energy accumulator, the generator and the consuming device (the disconnection switch being inoperative in this case). Moreover, as in the known wiring systems, during an accident, the disconnection switch interrupts the connection between the energy accumulator and the battery line. However, according to the invention, the connection between the energy accumulator, the battery line to the generator and the consuming device line is also interrupted simultaneously. The consuming device is therefore disconnected from the on-board wiring system and can no longer be supplied with electric energy by the generator or by the battery. As a result, lines or consuming devices which are particularly endangered in the case of a crash are securely separated from the energy source. For example, the whole electric system of the engine can be disconnected and fuses which are designed only as a short-circuit protection in the case of a crash are no longer required.

Other objects, advantages and novel features of the present invention will become apparent from the following detailed description of the invention when considered in conjunction with the accompanying drawings.

DETAILED DESCRIPTION OF THE DRAWINGS

Figure 1:
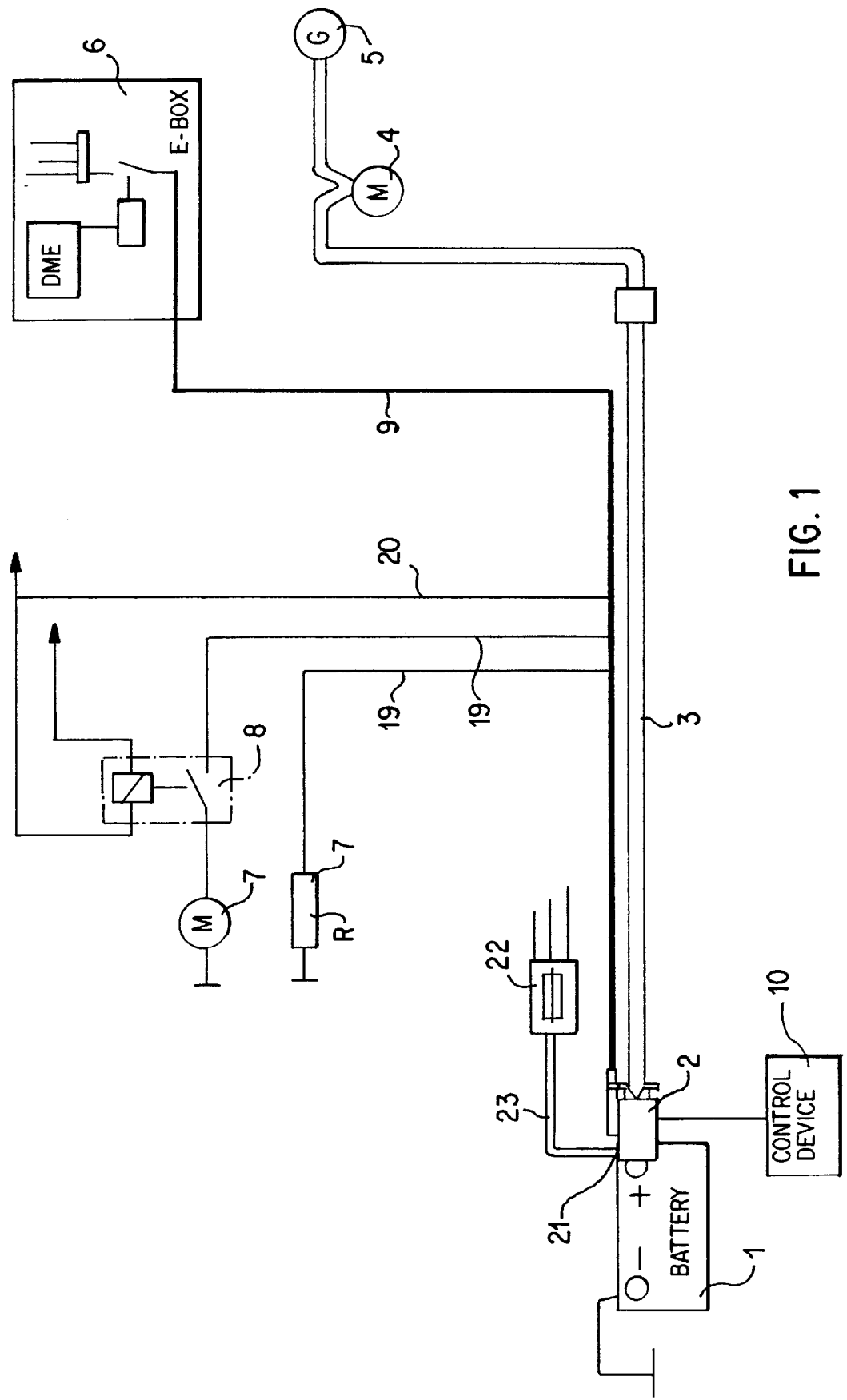
FIG. 1 is a basic wiring diagram of the on-board wiring system according to the invention.

The on-board wiring system illustrated in FIG. 1 contains an energy accumulator 1 having a disconnection switch 2 connected to a battery pole thereof. A battery line 3 connected to the disconnection switch 2 leads to a generator 5 by way of a starter motor 4. An electronic system 6 which is provided to control the vehicle engine (not shown) also controls the operation of an electric fuel pump 7 by means of a relay 8. The electronic system 6 is connected to the energy accumulator 1 by way of a consuming device line 9 (parallel to the battery line 3) via the disconnection switch 2.

After an accident, the disconnection switch 2 is triggered, for example, by an air bag control device 10 and disconnects the battery line 3 from the energy accumulator 1. Simultaneously, the consuming device line 9 is disconnected from the battery 1 as well as from the battery line 3.

Figure 2:
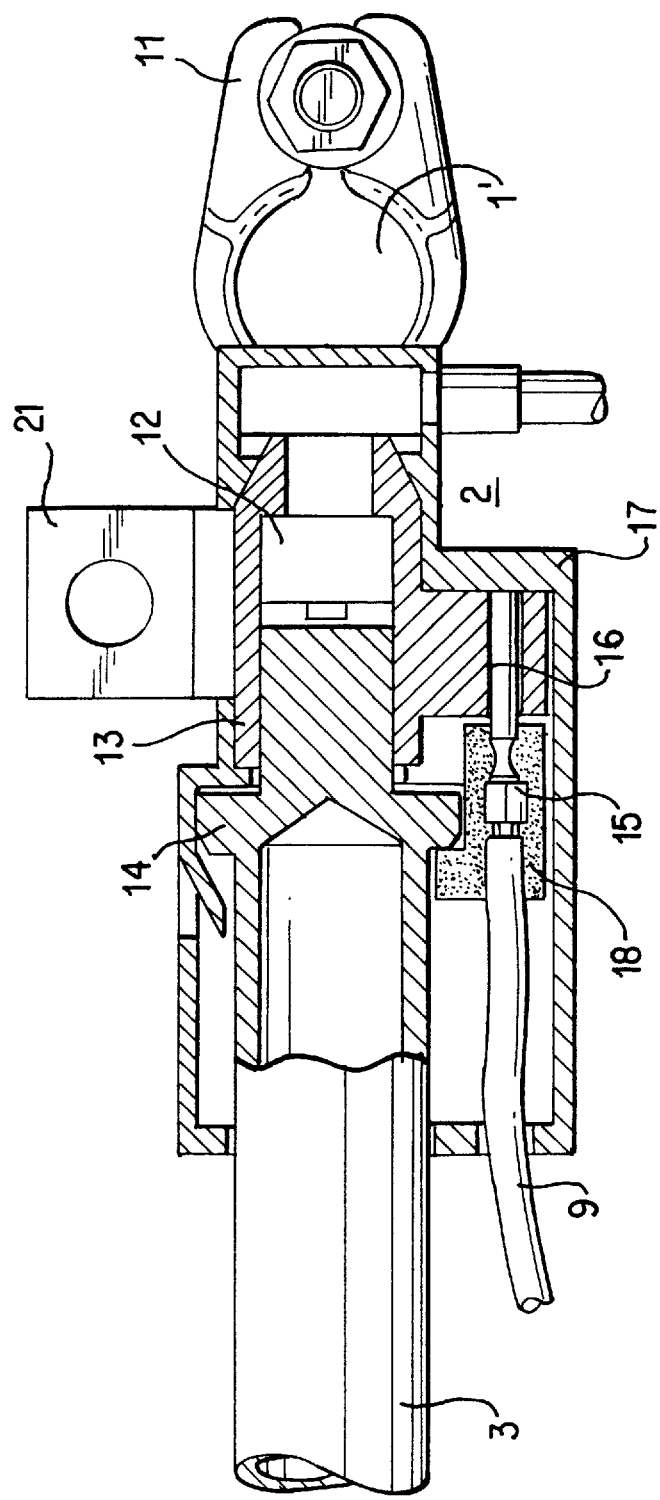
FIG. 2 is a cross sectional view showing constructional details of an embodiment of the invention.

The constructional details of the disconnection switch 2 are illustrated in detail in FIG. 2. A cable clamp 11 secures the disconnection switch 2 on a pole 1' of the battery 1. The switch has an auxiliary drive in the form of a gas generator 12 which can be actuated to interrupt a clamped connection between clamping parts 13 and 14 (not shown in detail) by driving the clamping part 14 out of the clamping part 13. The battery line 3 fastened to the clamping part 14 is therefore disconnected from the clamping part 13, and thus from the battery pole 1'.

The consuming device line 9 is connected by way of a connection 15 with a contact part 16 that in turn is in an electrically conducting connection with the clamping part 13. A plastic sheathing 17 surrounds the disconnection switch 2 and reaches to the connection 15. A driving device 18 is arranged in the area of the connection 15 between the consuming device line 9 and the contact part 16.

When the gas generator 12 is ignited, the battery line 3 is released as the clamping part 14 is ejected and separated from the clamping part 13. In addition, the driving device 18 is also moved simultaneously with the battery line 3, so that the connection 15/16 is interrupted, and the consuming device line 9 is disconnected from the battery line 3 as well as from the battery pole 1'. There will then be no electric connection between the battery line and the consuming device line 9. The electronic system 6 of the engine is therefore no longer supplied with electric energy.

As an alternative, it is also possible to connect other consuming devices to the consuming device line 9, in parallel to or instead of the electronic system 6. In this case, different constructions are possible, as indicated by electric lines illustrated by broken lines. It is possible to connect the power supply line 19 of the consuming device 7 to the consuming device line 9. Another possibility is to connect the control line 20 of the relay 8. In each case, it is ensured that the consuming device 7 is securely disconnected in the case of a serious accident.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. On-board wiring arrangement for an electrical system having a a generator which is connected with an energy accumulator via a battery line, a disconnection switch arranged in said battery line between said generator and said energy accumulator and being actuated as a result of an accident, and additional consuming devices connected to the energy accumulator and to the generator via a consuming device line which is connected to said battery line through said disconnection switch, wherein actuation of the disconnection switch disconnects the battery line from the energy accumulator, and also disconnects the consuming device line from both the accumulator and the generator.

2. On-board wiring system according to claim 1, wherein
   the disconnection switch has an auxiliary drive for interrupting the battery line; and
   the auxiliary drive also disconnects the consuming device line.

3. On-board wiring system according to claim 1 wherein the battery line is fastened together with the consuming device line and is released together with the consuming device line by the auxiliary drive.

4. On-board wiring system according to claim 1 wherein the disconnection switch has an insulating case which contains a driving device for disconnecting the consuming device line.

5. On-board wiring system according to claim 4 wherein the consuming device line is connected to a contact part which is electrically connected with the battery line.

6. A vehicle energy system comprising:
   a generator;
   an energy accumulator;
   a battery line connecting said generator with said energy accumulator; and
   energy consuming devices connected to the energy accumulator and to the generator via the battery line;
   wherein connections between said generator and said energy accumulator, and between said energy consuming devices and said energy accumulator and said generator, are provided via a disconnection switch which is operable in response to occurrence of an accident to break the connection of the generator to the energy accumulator via the battery line, and to disconnect the energy consuming devices from both the accumulator and the generator.

7. A wiring arrangement for an electrical system having a generator, an energy accumulator, and energy consuming devices, said wiring arrangement comprising:
   a battery line connecting said generator with said energy accumulator;
   a disconnection switch arranged in said battery line and operable to interrupt connection of said generator with said energy accumulator in response to occurrence of an event;
   at least one consuming device line connecting said energy consuming devices to said energy accumulator and to said generator via said battery line and said disconnection switch, whereby operation of said disconnection switch also disconnects said consuming device line from said energy accumulator and from said generator.

8. Method of protecting a vehicle energy system having a generator connected to an energy accumulator, and having energy consuming devices connected to said energy accumulator and to said generator, said method comprising:
   detecting occurrence of an event; and
   upon detection of an event, disconnecting said generator from said energy accumulator by means of a disconnection switch which is operable in response to said event, and disconnecting said energy consuming devices from said energy accumulator and from said generator by means of said disconnection switch.

* * * * *